No. 858,970. PATENTED JULY 2, 1907.
M. E. FRENCH.
EGG BEATER.
APPLICATION FILED MAR. 21, 1907.
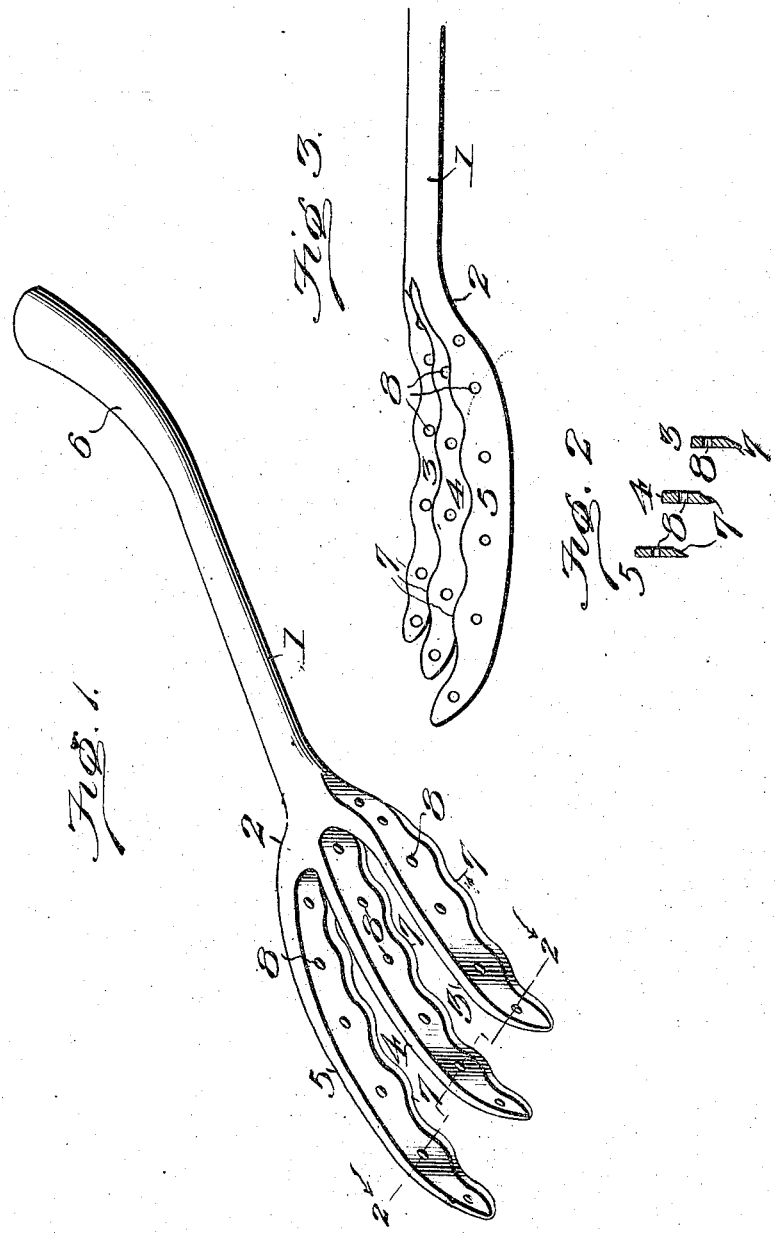
Inventor
Mary E. French.
Witnesses
Wm J. Koerth
Wm W. Bagger
By Victor J. Evans
Attorney

UNITED STATES PATENT OFFICE.

MARY E. FRENCH, OF CLYDE, OHIO.

EGG-BEATER.

No. 858,970.

Specification of Letters Patent.

Patented July 2, 1907.

Application filed March 21, 1907. Serial No. 363,617.

*To all whom it may concern:*

Be it known that I, MARY E. FRENCH, a citizen of the United States, residing at Clyde, in the county of Sandusky and State of Ohio, have invented new and useful Improvements in Egg-Beaters, of which the following is a specification.

This invention relates to egg beaters; and it has for its object to provide a utensil of this character which shall be simple in construction and thoroughly efficient in operation and which may be effectively used for the purpose of beating eggs, cream and the like, for mixing cake batter and for other analogous purposes.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention; it being, however, understood that no limitation is necessarily made to the precise structural details therein exhibited, but that changes, alterations and modifications within the scope of the invention may be resorted to when desired.

In the drawing, Figure 1 is a perspective view of an egg beater constructed in accordance with the invention showing the same in an inverted position. Fig. 2 is a transverse sectional view taken on the plane indicated by the line 2—2 in Fig. 1. Fig. 3 is a side view.

Corresponding parts in the several figures are denoted by like characters of reference.

The improved egg beater in its general construction and outline is allied to a fork, comprising a body 1 and a head 2 which latter is subdivided into a suitable number of prongs or tines of which, in the drawing, three have been shown, said prongs or tines being numbered 3, 4 and 5, respectively. It is to be understood, however, that in the actual manufacture of the device, it may be made with any desired number of prongs or tines.

The handle of the device is preferably curved as shown at 6, to enable the person using the device to get a firm grip thereupon. The head 2 is disposed obliquely with relation to the handle, and the prongs which consist of vertically disposed flat blades, will thus be disposed in different planes, one above the other, the one which in practice is nearest the person using the device being the lowermost one and the succeeding ones being raised step by step as will clearly appear by reference to the drawings. The backs of the prongs which in practice are held downward, are smooth and flat, while the upper edges of the prongs or blades are preferably provided with moderately sharp wavy or serrated edges, as shown at 7; the outer ends of said prongs or blades are also preferably curved in an upward direction, reference being had to the position occupied by the device when in use.

The prongs or blades may be and are preferably provided with transverse apertures, as shown at 8.

The manner of using this device and its advantages will be readily understood from the foregoing description taken in connection with the drawings. When the improved utensil is utilized for the purpose of beating eggs, cream, batter or the like, the blades or prongs will successively engage the material operated upon which will thus be thoroughly agitated and quickly rendered light, fluffy and foamy. By reason of the transverse apertures 8, the material that is being stirred or beaten will be more quickly broken up than would otherwise be the case, and it will be thoroughly aerated as is well known to be extremely desirable. By presenting the device in an inclined or oblique position, the connecting edges of the prongs or blades may be brought into play which is, at times desirable, as for instance when thick batter is to be mixed.

The improved device may be manufactured of any suitable material, such as steel, and it may be nickel-plated or otherwise protected against corrosion.

Having thus fully described the invention, what I claim as new is:—

1. An egg beater comprising a handle, and a head having a plurality of prongs or blades set in different planes, said prongs having smooth flat backs and wavy or serrated edges.

2. An egg beater comprising a handle and a head having a plurality of prongs or blades set in different planes; said prongs or blades being provided with smooth flat backs, wavy or serrated edges, and transverse apertures.

3. An egg beater comprising a handle and a head having a plurality of prongs or blades set in different planes; said prongs or blades being longitudinally curved in an upward direction and provided with smooth flat backs, wavy or serrated edges and transverse apertures.

In testimony whereof, I affix my signature in presence of two witnesses.

MARY E. FRENCH.

Witnesses:
H. G. GIBBONS,
JEREMIAH MORGAN.